358-190. XR 3,824,333 SR

United States Patent [19] [11] 3,824,333
Boekhorst [45] July 16, 1974

[54] AUDIO OUTPUT STAGE

[75] Inventor: Antonius Boekhorst, Eindhoven, Netherlands

[73] Assignee: U.S. Philips Corporation, New York, N.Y.

[22] Filed: Nov. 29, 1972

[21] Appl. No.: 310,672

[30] Foreign Application Priority Data

Dec. 23, 1971 Netherlands ....................... 7117711

[52] U.S. Cl. ...... 178/5.8 R, 178/7.3 R, 178/DIG. 11
[51] Int. Cl. ............................................ H04n 5/44
[58] Field of Search ........... 178/7.3 R, 7.5 R, 5.8 R, 178/DIG. 11

[56] References Cited

FOREIGN PATENTS OR APPLICATIONS 1,041,370 9/1966 Great Britain .............. 178/DIG. 11

*Primary Examiner*—Robert L. Richardson
*Attorney, Agent, or Firm*—Frank R. Trifari; Henry I. Steckler

[57] ABSTRACT

An audio output amplifier powered from a television horizontal circuit has a constant current source series coupled to the audio output stage. As the audio signal varies, the constant current divides between the output stage and a loudspeaker coupled in parallel with it in accordance with the strength of the audio signal. Thus a constant load is presented to the horizontal circuit, which does not affect the deflection.

5 Claims, 1 Drawing Figure

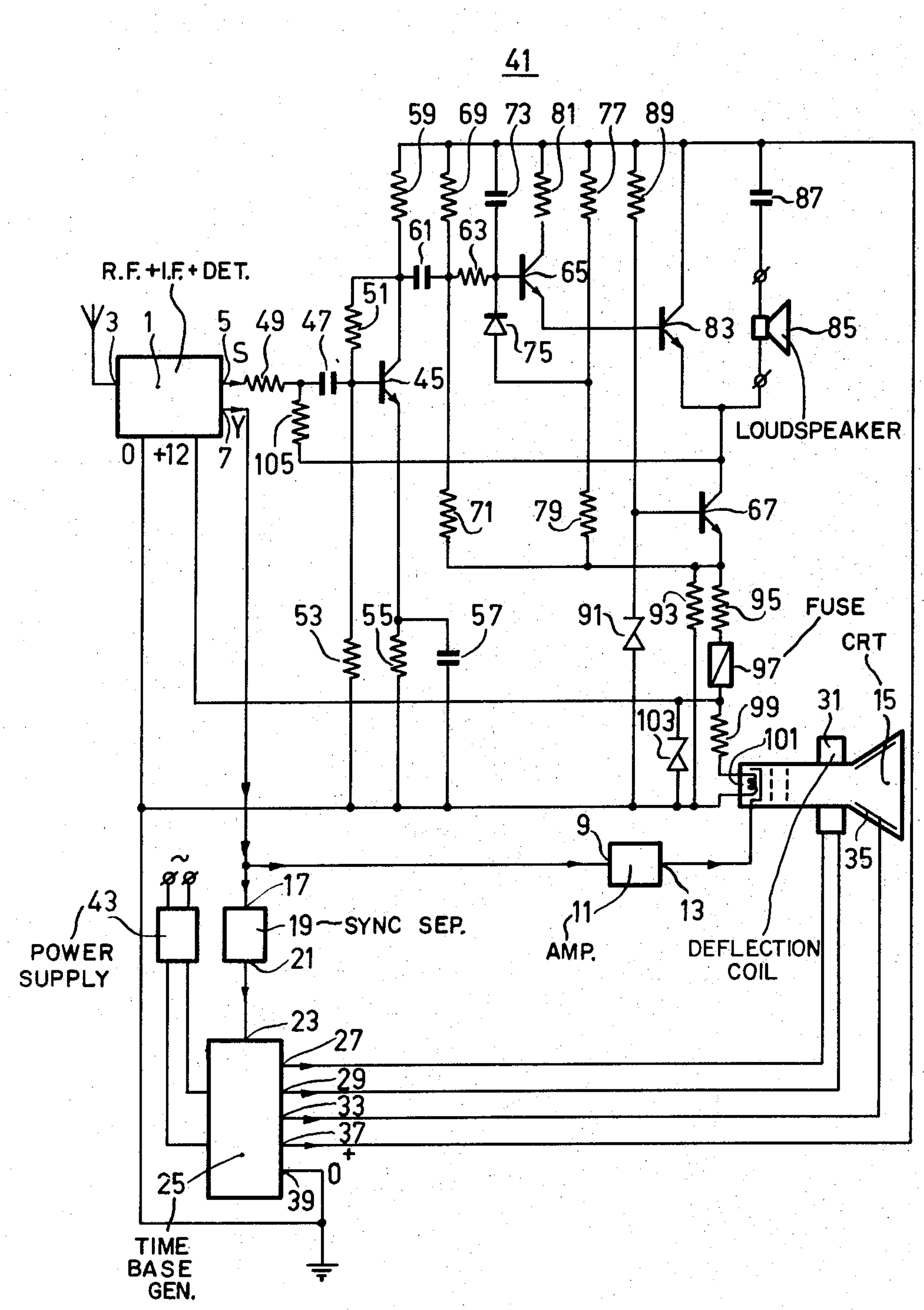
41
R.F.+I.F.+DET.
LOUDSPEAKER
FUSE
CRT
POWER SUPPLY
SYNC SEP.
AMP.
DEFLECTION COIL
TIME BASE GEN.

AUDIO OUTPUT STAGE

The invention relates to an audio output stage to be fed from the line deflection circuit of a television receiver, including a series connection of a first and a second transistor of the same conductivity type and a terminal for a sound reproducer connected to the junction of the emitter of the first and the collector of the second transistor.

Known output stages of the abovementioned type have the drawback that when driven by an audio frequency signal, they present a varying load to their power supply, thus influencing the deflection circuit providing this power supply. It is possible to overcome this drawback with a dual push-pull version of the output stage, but this requires four output transistors and is consequently not a very attractive solution.

The object of the invention is to provide a simple output stage which does not have said drawback.

An audio frequency output stage according to the invention as mentioned in the preamble is therefore characterized in that the second transistor is connected as a direct current source, whereas a further connection for the sound reproducer is coupled at least with respect to alternating current to a collector supply connection of the first transistor.

The invention will now be described with reference to an embodiment as shown in the drawing.

The sole FIGURE of the drawing shows a circuit diagram of a television receiver having an A.F. output stage according to the invention, being partly represented in block-schematic form.

In the FIGURE a high-frequency, intermediate frequency, and detection circuit 1 has an input 3 to which a received television signal is applied, a first output 5 at which an audio signal S and a second output 7 at which a video signal Y is available.

The video signal Y is applied to an input 9 connected to the output 7, of an output amplifier 11 whose output 13 is connected to the cathode of a display tube 15. The video signal Y is further applied to an input 17, connected to the output 7, of a synchronizing pulse separator 19 whose output 21 is connected to an input 23 of a time base generator 25.

Of the time base generator 25 two outputs 27, 29 are connected to a deflection coil system 31 of the display tube 15 for supplying horizontal and vertical deflection currents, and a third output 31 is connected to an anode 35 of the display tube 15 for delivering a supply voltage. A fourth and fifth output 37 and 39 are the outputs for a direct voltage supplied by the deflection circuit 25 and feeding an audio frequency amplifier 41.

The time base generator 25 is, for example, supplied from a power supply circuit 43, to be connected to the mains.

The low-frequency amplifier 41 has an input transistor 45 whose base is connected to the output 5 of section 1 via a capacitor 47 and a resistor 49, and which receives an audio frequency signal via this path. The base is biased via a potential divider 51, 53 included between the collector and the neutral terminal which is connected to output 39 of time base generator 25. The emitter is connected to the neutral terminal via a parallel connection of a resistor 55 and a decoupling capacitor 57.

An amplified audio frequency signal which is applied via a capacitor 61 and a resistor 63 to the base of a transistor 65 connected in emitter-follower arrangement is produced across a collector resistor 59 which is connected to the positive supply voltage connection 37 of the time base generator 25. The transistor 65 is biased by a potential divider 69, 71 which is connected between the positive supply voltage and the emitter of a transistor 67.

The base of the transistor 65 is decoupled for very high frequencies via a capacitor 73 and via a diode 75 it is connected to a potential divider 77, 79 which is included between the positive supply connection and the emitter of the transistor 67. The diode 75 together with the resistor 63 constitutes a limiter for excessive negative going signal peaks. The collector of the transistor 65 is connected to the positive supply voltage via a resistor 81, the emitter is connected to the base of a transistor 83 whose collector is connected to the positive supply voltage and whose emitter is connected to the collector of the transistor 67 which is of the same conductivity type, and to a connection of a sound reproducer 85 whose other connection is coupled with respect to alternating current to the positive supply voltage via a capacitor 87.

The base of the transistor 67 receives a constant bias voltage which is obtained via a resistor 89 to the positive supply voltage, across a zener diode 91 which is connected to the neutral terminal.

The emitter of the transistor 67 is connected to the neutral terminal via a parallel connection of a resistor 93 with a series connection of the resistor 95, a safety fuse 97, a resistor 99 and a heater electrode 101 of the display tube 15. A zener diode 103, which is normally cut off, bypasses the resistor 99 and the heater electrode 101, to provide a protection against high voltages in the event of defects.

The transistor 67 constitutes a direct current source which supplies a constant direct current to the connection point of the emitter of the transistor 83 and the sound reproducer 85. Due to this constant direct current the power supply is constantly loaded and the time base generator cannot be influenced by the drive of the audio frequency stage. Driving the transistor 83 influences the current distribution between the transistor 83 and the sound reproducer 85 without affecting the current delivered by the power supply. An excessive negative drive of the transistor 83 would result in the transistor 67 becoming fully conductive, which could thus interrupt the current source action of this transistor and overload the heater circuit of the display tube 15. This is prevented by the aforementioned limiter circuit with the diode 75 which, of course, may alternatively be included for the same purpose at other points of the circuit.

The voltage on the emitter of the transistor 67 is constant because the voltage on its base is constant; the heater electrode 101 of the display tube 15 is thus supplied from a constant voltage source which has a favourable effect on the life of this tube.

A voltage which is used as supply voltage for the transistorized section 1 develops across the series connection of the resistor 99 and the heater electrode 101.

The current not required for power supply of the heater electrode and of section 1 is drained by the resistor 93.

The safety fuse 97 serves to protect the circuit in the event of defects, as does the previously mentioned normally non-conductive zener diode 103.

A feedback resistor 105 is included between the collector of the transistor 67 and the junction of the resistor 49 and the capacitor 47.

It is obvious that when using transistors of another conductivity type, the positions of the directcurrent source circuit and the driven part of the circuit should be reversed as compared with the circuit arrangement described above.

If desired, the safety fuse 97 may alternatively be included in a common line to the collector of the transistor 83 and the capacitor 87.

What is claimed is:

1. A circuit for amplifying an alternating current signal and for providing a constant load to a power supply comprising an alternating current amplifier stage having an input means for receiving said alternating current signal and an output means for supplying said alternating signal in amplified form to a load, and means series coupled to said stage for providing a constant direct current thereto, whereby the current from said providing means is divided between said stage and said output means and load in accordance with said alternating current signal, thereby presenting a constant load to said power supply.

2. A circuit as claimed in claim 1 wherein said stage and said providing means respectively comprise first and second transistors, said first transistor having emitter and base electrodes coupled to said output means, and said second transistor having a collector coupled to said first transistor emitter.

3. A circuit as claimed in claim 1 further comprising a tube heater filament coupled in series with said stage and providing means.

4. A circuit as claimed in claim 1 further comprising an amplitude limiter coupled to said input means.

5. A circuit as claimed in claim 1 wherein said alternating current signal comprises an audio signal and further comprising the load and the power supply, said load comprising a sound reproducer, and said power supply comprising a television line deflection circuit.

* * * * *